Patented Feb. 13, 1945

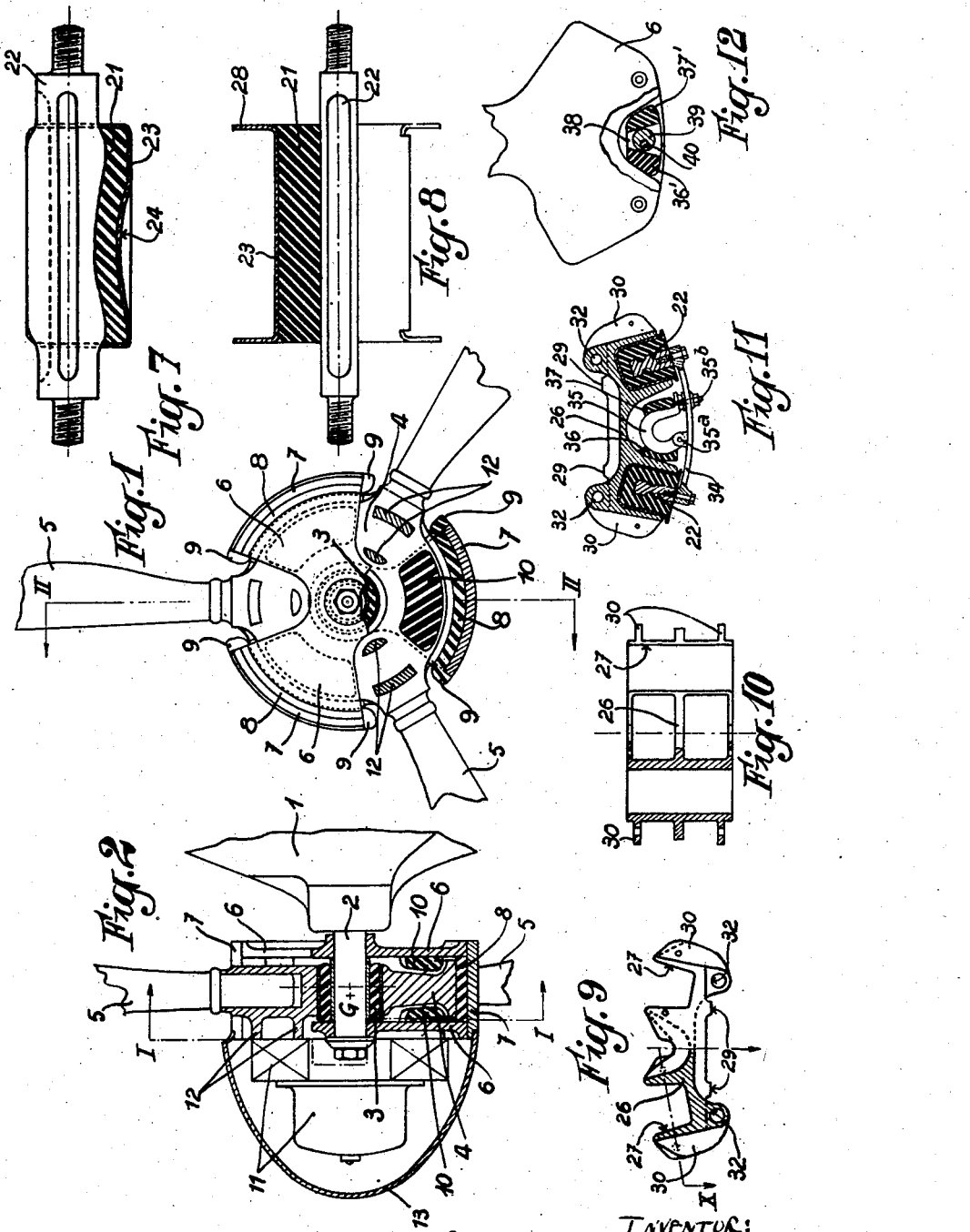

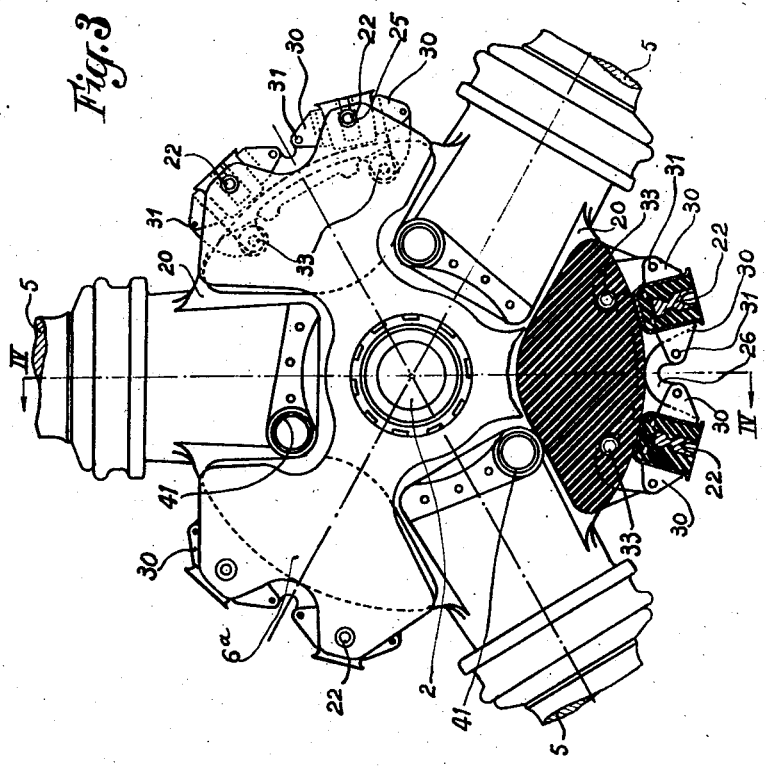
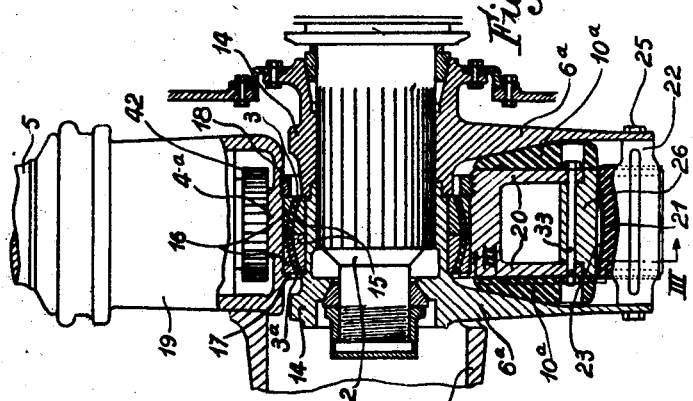

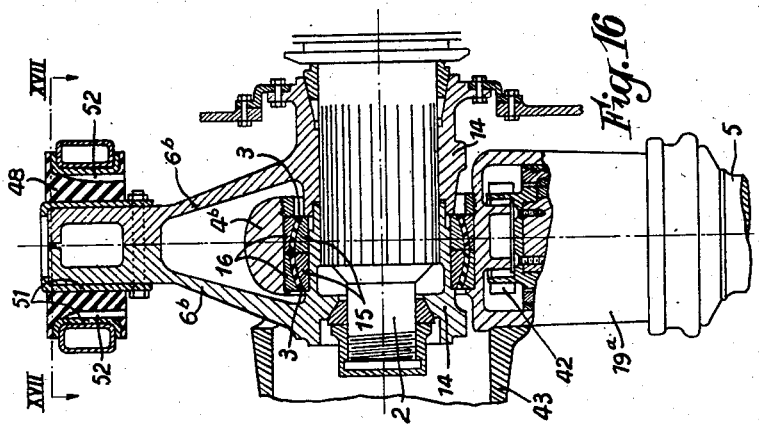

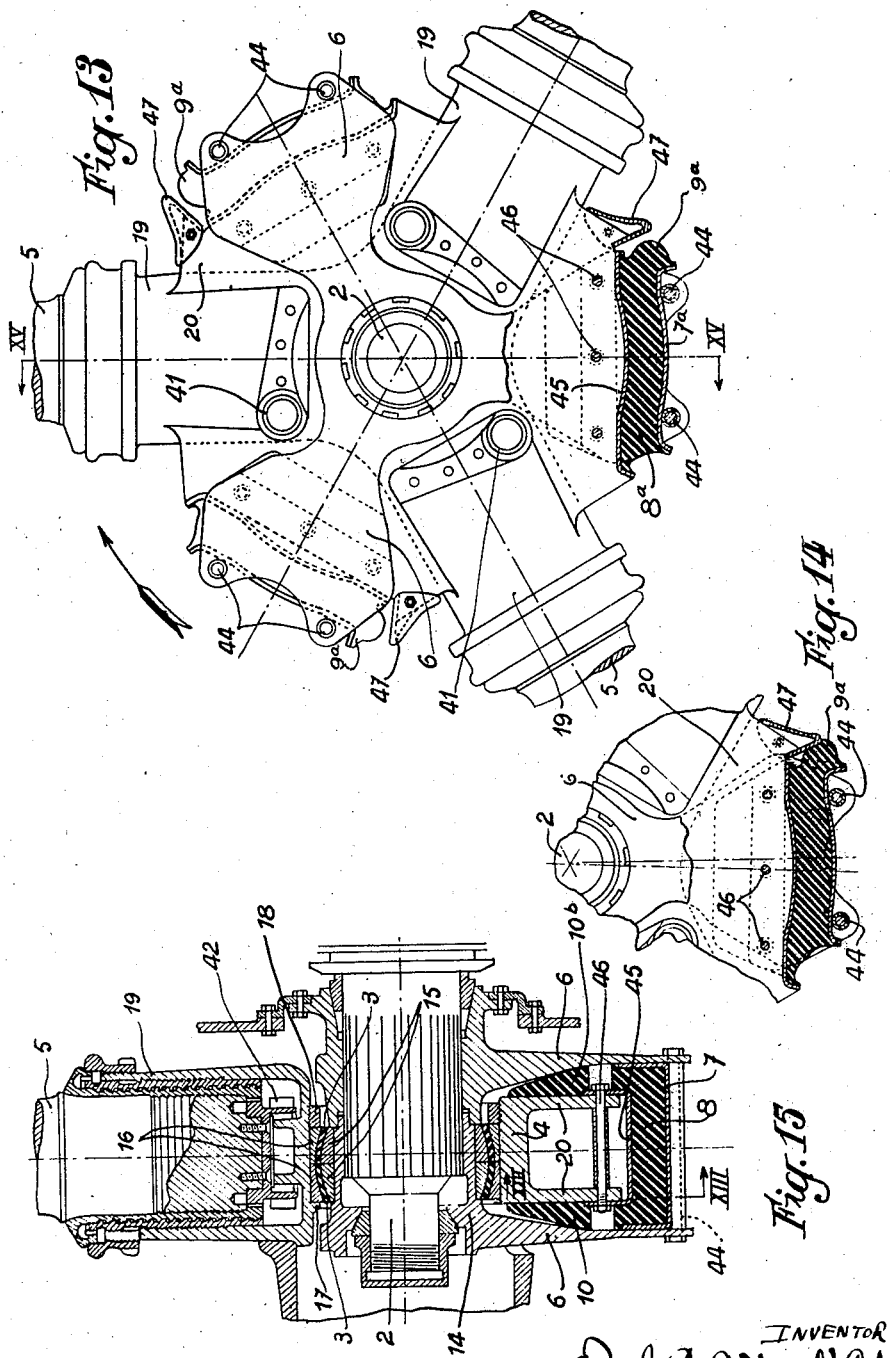

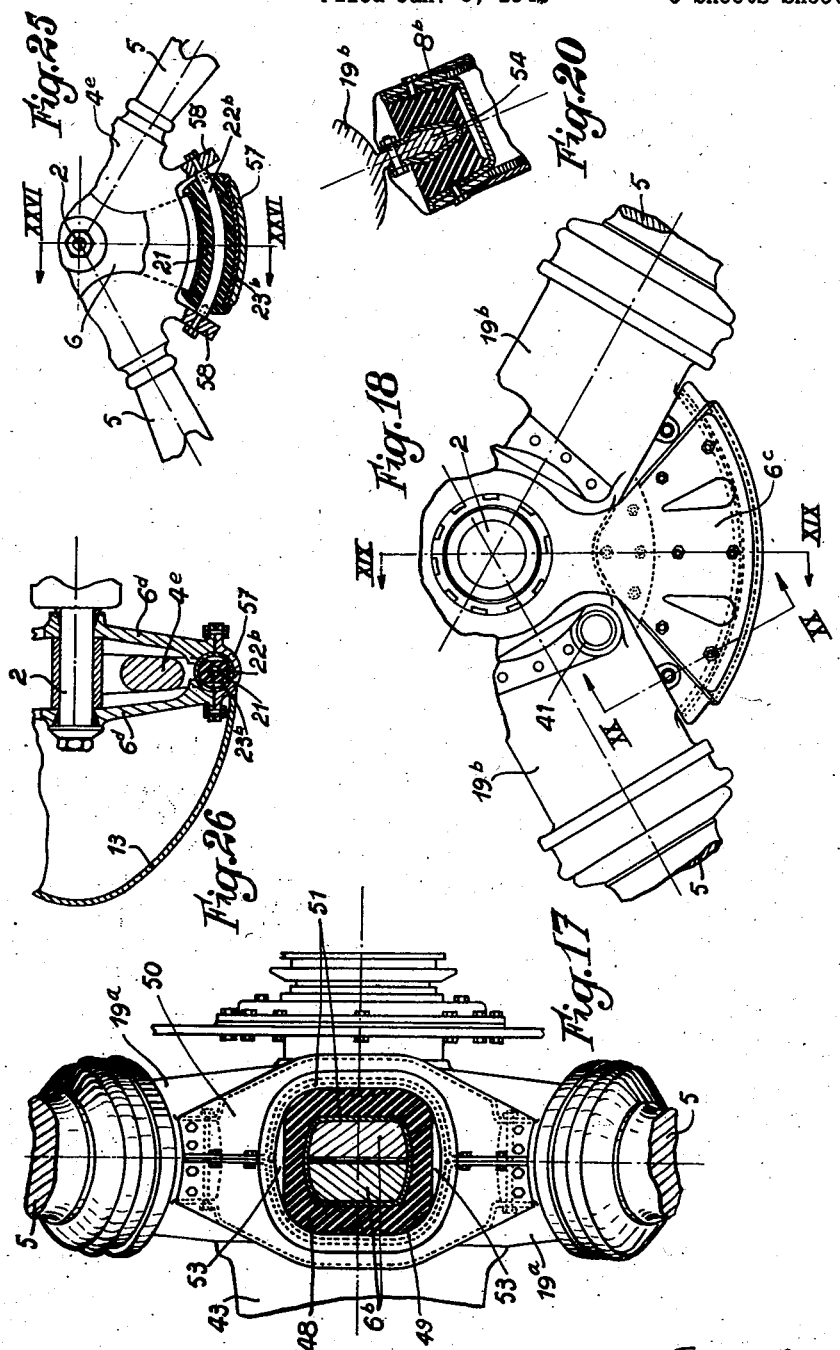

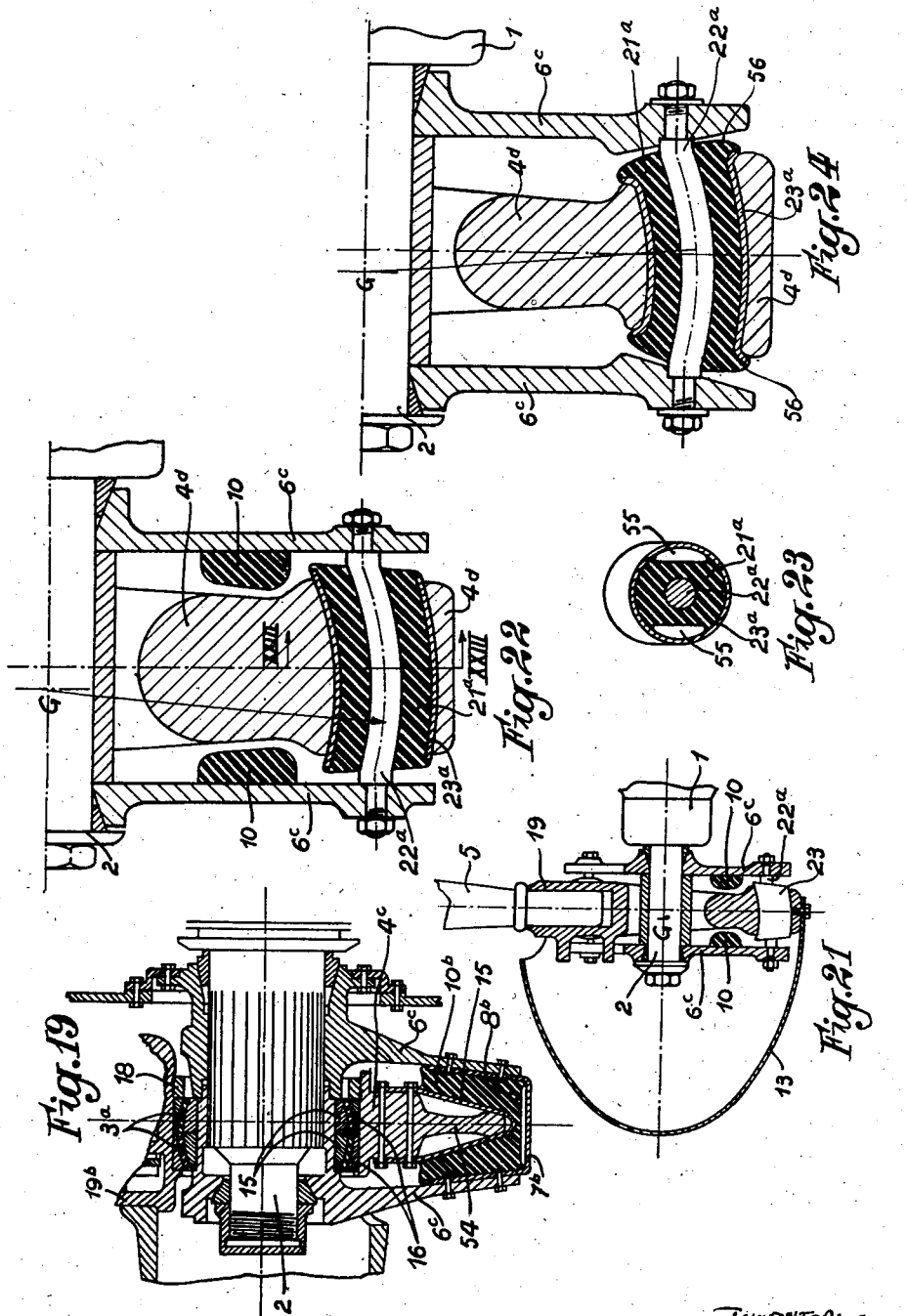

2,369,538

UNITED STATES PATENT OFFICE 2,369,538

AIRSCREW PROPELLER MOUNTING

Paul Charles Albert Marie d'Aubarede, Saint-Genis-Laval, France; vested in the Alien Property Custodian Application January 5, 1942, Serial No. 425,692

13 Claims. (Cl. 170—173)

My invention relates to the elastic mounting of aircraft propellers on their driving shafts.

Elastic propeller mountings avoid or reduce the transmission of vibrations resulting from periodic torques from the power shaft to the propeller blades. It is also of advantage to give the propeller a limited amount of freedom to tilt its geometrical axis with respect to the power shaft axis, which avoids or reduces the stresses resulting from the propeller blades passing in front of a wing or any other obstruction to the flow of air, from a lack of balance between the blades, from the gyroscopic torques caused by the oscillations of the power shaft axis, particularly in the case of elastically mounted engines which generally oscillate more or less conically about a natural or fixed axis, etc. With an appropriate elastic mounting of the propeller, these oscillations of the geometrical axis of the power shaft do not affect or affect only slightly the axis of the propeller.

My invention has for its object an elastic mounting which possesses a high mechanical strength while permitting the propeller to oscillate in any direction with respect to the power shaft axis.

Another object of my invention is to provide an elastic propeller mounting which may be applied to variable-pitch propellers without requiring an additional radial space with respect to the space necessitated by the pitch controlling device.

Still another object of my invention is an elastic mounting wherein the elastic members ensuring the transmission of the power torque and of the axial effort of the propeller, as well as the elastic members limiting the oscillations or tilting motions of the propeller with respect to the power shaft, are disposed externally of the propeller hub, substantially in the vicinity of the average plane of the propeller blades and in the spaces between the successive blades.

Still a further object of my invention is an elastic propeller mounting wherein the propeller hub is comprised between two star-shaped plates to which the elastic members are attached, the radial arms of the plates projecting between the propeller blades, while the latter are disposed in the spaces between the successive radial arms of the plates, and the corresponding arms of the two plates being connected with each other either directly or by transverse stays passing between the propeller blades.

My mounting preferably comprises a spherical elastic member carried by the power shaft and supporting the propeller hub, said member forming merely a center for the propeller without materially ensuring the transmission of torque or of axial effort. Said member is preferably located in the vicinity of the center of gravity of the propeller.

My mounting also comprises abutments adapted to limit the oscillations or tilting motions of the propeller with respect to the power shaft, said abutments being inactive or almost inactive in normal operation (cruising conditions, for instance), but preventing the too large displacements resulting for instance from the sudden application of the full power of the engine, from rough atmospheric conditions, etc.

In the annexed drawings:

Fig. 1 is a front view, with partial section along line I—I of Fig. 2, showing a diagrammatical embodiment of my invention.

Fig. 2 is a longitudinal section thereof along line II—II of Fig. 1.

Fig. 3 is a front view of a mounting according to my invention, with partial section taken along line III—III of Fig. 4.

Fig. 4 is a longitudinal section taken along line IV—IV of Fig. 3.

Fig. 5 is a front view of the propeller hub used in the mounting of Figs. 3 and 4.

Fig. 6 is a longitudinal section thereof taken along line VI—VI of Fig. 5.

Fig. 7 is a sectional view to an enlarged scale of a torque transmitting member.

Fig. 8 is a plan view thereof with partial section.

Fig. 9 is a front view with partial section showing the box adapted to cooperate with a pair of torque transmitting members.

Fig. 10 is a plan view thereof with partial section along line X—X (Fig. 9).

Fig. 11 is a partial cross-section of a torque transmitting device provided with abutments to limit the relative angular displacements.

Fig. 12 is a partial cross-section illustrating a modification.

Fig. 13 is a front view of a second embodiment of my invention, with partial section taken along line XIII—XIII of Fig. 15. In this figure the torque is supposedly applied by the power shaft to the propeller.

Fig. 14 is a partial section showing the parts at the no-load position.

Fig. 15 is a longitudinal section taken along line XV—XV of Fig. 13.

Fig. 16 is a longitudinal section illustrating a third embodiment of my invention.

Fig. 17 is a corresponding plan view with parts in section along line XVII—XVII of Fig. 16.

Fig. 18 is a partial front view illustrating a modification of the mounting of Figs. 13 to 15.

Fig. 19 is a section along line XIX—XIX of Fig. 18.

Fig. 20 is a diagrammatic section along line XX—XX of Fig. 18.

Fig. 21 shows another embodiment of my invention in general longitudinal section.

Fig. 22 is a partial detailed view thereof.

Fig. 23 is a cross section taken along the line XXIII—XXIII of Fig. 22.

Fig. 24 illustrates a minor modification.

Fig. 25 is a partial front view with parts in section, showing a further embodiment of my invention.

Fig. 26 is a section taken along line XVI—XVI of Fig. 25.

In Figs. 1 and 2, which are only given to illustrate diagrammatically the main features of my invention, 1 designates an engine of any description, for instance an internal combustion engine. 2 is the power shaft thereof about which there is disposed an annular rubber member 3 about which there is disposed a hub 4 on which are mounted three propeller blades 5.

On each side of hub 4, the shaft 2 carries plates 6 respectively, each plate 6 having three arms projecting radially in the spaces between the successive propeller blades 5, as clearly shown in Fig. 1, while the blades project in the spaces between the successive arms.

The corresponding arms of plates 6 are connected with each other by means of arcuate members 7 pasing between the successive blades 5. And the inner face of each member 7 is elastically attached to the outer cylindrical face of hub 4 by a layer 8 of rubber. This layer projects slightly beyond the ends of member 7 so as to form a sort of buffer 9 adapted to cooperate with the bases of blades 5 to limit the angular displacement of hub 4 with respect to plates 6.

The inner faces of plates 6 also carry rubber blocks 10 adapted to co-act with the lateral faces of hub 4 to limit the tilting motion of the geometrical axis of hub 4 with respect to the axis of shaft 2. At the idle position blocks 10 are spaced from hub 4 as shown in Fig. 2. Blocks 10 are arranged between the propeller blades as indicated in Fig. 1.

The propeller assembly also comprises a pitch controlling device generally referenced 11 of the electric type and which has been supposedly removed in Fig. 1. This device will not be described since it forms no part of my invention. It is fixed to hub 4 by means of ribs 12 projecting therefrom and is housed within the conventional spinner 13.

Member 3 supports hub 4 on shaft 2, while permitting same to oscillate elastically in any direction. The rubber layers 8 transmit the power torque from plates 6 to hub 4. They also transmit the axial pull of the propeller blades from hub 4 to plates 6, the plates 6 being mechanically connected with each other by means of members 7. Buffers 9 and blocks 10 limit the displacement of hub 4. They are normally inactive.

Owing to the disposition of the rubber members 8 and 10 between the successive blades, the axial length or thickness of the propeller assembly is not substantially increased with respects to a rigid mounting. The pitch-controlling device 11 is fixed to the propeller hub in the usual manner and needs no universal joint or the like between its internal gearing and the blades. The diameter of the propeller spinner is still determined by the inner ends of the active portion of the blades and is not enlarged by the elastic members.

In the construction shown in Figs. 3 and 4, plates 6—a are carried by two hubs 14 keyed in contacting relation on shaft 2. The propeller centering member is in two parts, each comprising an inner ring 15 and an outer ring 16 elastically connected with each other by a layer 3—a of rubber of substantially spherical form, as shown in Fig. 4. Rings 15 are clamped on the front hub 14 while rings 16 are fixed on the inner face of the propeller hub 4—a between an annular rib 17 and a screwed ring 18.

Figs. 5 and 6 clearly show the construction of the propeller hub 4—a which comprises radial housings 19 for the blade ends, connected together by U-shaped portions having spaced wings 20.

The torque transmitting members (Figs. 7 and 8) comprise a mass of rubber 21 interposed between stays 22 connecting plates 6—a and boxes 23 fixed to the wings 20 of hub 4—a. The boxes 23 are U-shaped in section, as shown in Fig. 3 with the open face disposed outwardly with respect to hub 4—a. The bottom of each box is preferably rounded, as indicated at 24 (Fig. 7) concentrically with respect to the rubber layer 3—a (Fig. 4); the adjacent side of stay 22 is correspondingly rounded. Stays 22 are fixed to plates 6—a by means of nuts 25.

Boxes 23 are fixed to wings 20 by means of cradle members 26 (Figs. 9 and 10) comprising housings 27 to receive the said boxes which are longitudinally retained by their flanged ends 28 (Fig. 8). Members 26 (Figs. 9 and 10) are also provided with lateral projections 29 adapted to fit into recesses 29a of wings 20 (Fig. 5) and with wings 30 (Fig. 9) fixed to wings 20 by means of screws or bolts 31 (Fig. 3). Members 26 also have holes 32 (Fig. 9) through which are passed bolts 33 (Figs. 3 and 4) driven through wings 20.

The torque transmitting members described may transmit the longitudinal pull. They may form by themselves abutments limiting angular displacements of hub 4—a with respect to plates 6—a about the axis of shaft 2, or such abutments may be provided in addition to the said members as shown in Figs. 11 and 12.

In Fig. 11 an arcuate member 34 is fixed to two successive stays 22 and it carries a support 35 supporting two rubber blocks 36 and 37 adapted to cooperate with the walls of the housings 27 (Fig. 9) of member 26. At the no-load position (Fig. 11) block 36 contacts member 26 while block 37 is spaced therefrom. Under normal load the two blocks are equally spaced from member 26 and in the case of overload block 37 abuts against the latter. Support 35 may be arranged adjustable, as shown, by being pivoted at 35a and retained by an adjustable screw 35b.

In Fig. 12 rubber blocks 36′ and 37′ are carried by a member 38 which is adjusted by means of an eccentric 39 keyed on a shaft 40.

The propeller assembly also comprise rubber blocks 10—a fixed on the outer faces of wings 20 and adapted to form abutments in co-operation with the inner faces of plates 6—a (Fig. 4). Blocks 10—a preferably contact plates 6—a under light pressure, as shown. They elastically prevent too large oscillations of the axis of hub 4—a with respect to shaft 2 and they transmit, at least in part, the propeller pull from hub 4—a to plates 6—a.

The propeller assembly further comprises a pitch control gear which is not illustrated. Fig. 3 shows the bearings 41 for the controlling shafts which carry worm gears in mesh with gear wheels 42 (Fig. 4) provided at the inner ends of blades 5. The controlling shafts, not shown, are driven by an electric motor carried by a support partially shown at 43 (Fig. 4).

In the construction shown in Figs. 13 to 14 the elastic members adapted to transmit the power torque and the propeller pull are formed of masses of rubber 8—a fastened between a plate 7—a fixed to plates 6 by means of bolts 44, and a plate 45 fixed by bolts 46 to wings 20 of hub 4—a. The rubber 8—a extends radially along the outer faces of wings 20 so as to form lateral blocks 10—b which do not contact plates 6 or only contact same under light pressure (Fig. 15).

The rubber interposed between plates 7—a and 45 projects rearwardly (with respect to the direction of rotation of the propeller) forming a sort of buffer 9—a which at the no-load position (Fig. 14) abuts against an abutment 47 fixed to wings 20. Under normal load buffer 9—a is spaced from abutment 47.

The rubber parts 8—a, 9—a and 10—a substantially operate as parts 8, 9 and 10 described with reference to Figs. 1 and 2.

In the construction shown in Figs. 16 and 17 the arms of plates 6—b are brought into contact between the successive blades. The elastic member forming a connection between the plates 6—b and the propeller hub 4—b is formed of a ring 48 of rubber surrounding the ends of the arms of plates 6—b, the said ring 48 being housed within a recess 49 provided in a member 50 connecting two successive blade housings 19—a. The mass 48 of rubber is preferably fixed between two armatures 51, void spaces 52 and 53 being provided to facilitate rubber expansion and to lower the elastic reaction under normal loads. When one of these spaces disappears, for instance due to a high increase of the power torque, the elastic reaction increases and the elastic member operates as a limiting abutment to prevent too large oscillations.

The construction shown in Figs. 18 to 20 is substantially similar to Figs. 13 and 15, but in the propeller hub 4—c the blade housings 19—b are connected with each other by a T-shaped portion 54 in lieu of wings 20 of Figs. 5 and 6. The mass of rubber 8—b-10—b is V-shaped as shown, plates 6—c being slightly conical. The outer plate 7—b is here strong enough to form a stay between plates 6—c.

When the elastic members adapted to transmit the power torque and the propeller pull are appropriately disposed, the centering member 3—a may be dispensed with. It is then necessary that the elastic members only permit the propeller hub to move substantially spherically about a center coincident with the center of gravity thereof, the degree of freedom in any other direction being very limited. This could be achieved, in the mounting of Figs. 3 and 4 with a limited thickness of rubber between each stay 22 and the bottom of the corresponding box 23, the bottom and the corresponding face of the stay being curved as shown to a radius from the center of gravity of the propeller.

Figs. 21 to 24 show a mounting which is generally similar to the mounting of Figs. 3 and 4. In this mounting the stays 22—a connecting the two plates 6—c are curved concentrically to the center of gravity G. They are surrounded by a cylindrical (or more exactly toric) mass of rubber 21—a disposed within a box 23—a passed through the propeller hub 4—d. In Figs. 21 and 22 plates 6—c are provided with rubber blocks 10 forming lateral abutments. No centering member is provided, but owing to the shape of stays 22—a, the propeller hub 4—d oscillates substantially spherically about G.

In order to obtain a sufficient elasticity about the axis of shaft 2 without having to use a very soft rubber which would result in a too large radial freedom, void spaces 55 are left within box 23—a to permit free lateral expansion of rubber 21—a (Fig. 23).

The mounting of Fig. 24 only differs from Fig. 22 by the omission of blocks 10 the role of which is played by the ends of the mass of rubber 21—a which project beyond the ends of boxes 23—a and form buffers or abutments in cooperation with plates 6—c, as indicated at 56.

In the mounting of Figs. 25 and 26 the toric boxes 23—b instead of being transverse with respect to plates 6—d, are disposed in the average plane of the blades 5. They are supported by plates 6—d which are slightly conical, and are fixed thereto by a cover 57. Stays 22—b are fixed to lugs 58 carried by the propeller hub 4—e.

I claim:

1. An air-screw propeller assembly comprising a propeller hub; propeller blades carried by said hub; a propeller shaft substantially co-axial with said hub, means to hold the shaft in spaced relation with the hub; a pair of plates fixedly mounted on said propeller shaft coaxially of the same and one on each side of said propeller hub, said plates having arms radially disposed with respect to said shaft opposite the spaces between said successive blades; and elastic means attached to the hub and to the plates adapted to transmit the power torque and the axial effort between the arms of said plates and said propeller hub.

2. In an air-screw propeller assembly as claimed in claim 1, in which the means to hold the shaft in spaced relation with the hub comprises elastic centering means interposed between said propeller shaft and said propeller hub internally of said hub, said means permitting limited angular oscillations of said hub with respect to said shaft.

3. In an air-screw propeller assembly as claimed in claim 1, abutments limiting oscillations of said propeller hub about the axis of said propeller shaft with respect to said shaft.

4. In an air-screw propeller assembly as claimed in claim 1, abutments limiting tilting oscillations of the axis of said propeller hub with respect to the axis of said propeller shaft.

5. An air-screw propeller assembly comprising a propeller hub; propeller blades carried by said hub; a popeller shaft substantially co-axial with said hub, means to hold the shaft in spaced relation with the hub; a pair of plates fixedly mounted on said propeller shaft co-axially of the same, and one on each side of said propeller hub, said plates having arms radially disposed with respect to said shaft opposite the spaces between said successive blades; means to mechanically connect the arms of one of said plates with the corresponding arms of the other externally of said hub and through the spaces between said successive blades; and elastic means attached to the hub and to the said connecting means adapted to transmit the power torque and the axial effort between said connecting means and said propeller hub.

6. In an air-screw propeller assembly as claimed in claim 5, in which means to hold the shaft in spaced relation with the hub comprises elastic centering means interposed between said propeller shaft and said propeller hub internally of said hub, said means permitting limited angular oscillations of said hub with respect to said shaft.

7. In an air-screw propeller assembly as claimed in claim 5, abutments limiting oscillations of said propeller hub about the axis of said propeller shaft with respect to said shaft.

8. In an air-screw propeller assembly as claimed in claim 5, abutments limiting tilting oscillations of the axis of said propeller hub with respect to the axis of said propeller shaft.

9. An air-screw propeller assembly comprising a propeller hub; propeller blades carried by said hub; a propeller shaft substantially co-axial with said hub, means to hold the shaft in spaced relation with the hub; a pair of plates fixedly mounted on said propeller shaft coaxially of the same and one on each side of said propeller hub, said plates having arms radially disposed with respect to said shaft opposite the spaces between said successive blades; stays mechanically connecting the arms of one of said plates with the corresponding arms of the other externally of said hub and through the spaces between said successive blades; open-ended boxes disposed around said stays and in spaced relation therewith, said boxes being fixed to said hub; and elastic rubber interposed between each stay and the walls of the corresponding box.

10. In an air-screw propeller assembly as claimed in claim 9, in which the means to hold the shaft in spaced relation with the hub comprises elastic centering means interposed between said propeller shaft and said propeller hub internally of said hub, said means permitting limited angular oscillations of said hub with respect to said shaft.

11. In an air-screw propeller assembly as claimed in claim 9, abutments limiting oscillations of said propeller hub about the axis of said propeller shaft with respect to said shaft.

12. In an air-screw propeller assembly as claimed in claim 9, abutments limiting tilting oscillations of the axis of said propeller hub with respect to the axis of said propeller shaft.

13. An air-screw propeller assembly comprising a propeller hub; propeller blades carried by said hub; a propeller shaft substantially co-axial with said hub, means to hold the shaft in spaced relation with the hub; a pair of plates fixedly mounted on said propeller shaft co-axially of the same and one disposed at each side of said propeller hub; and elastic means adapted to transmit the power torque and the axial effort between said plates and said hub, said means being disposed externally of said hub in the vicinity of the average plane of said propeller blades and the spaces between the successive blades.

PAUL CHARLES ALBERT MARIE D'AUBAREDE.